Oct. 20, 1970
JAMES E. WEBB
ADMINISTRATOR OF THE NATIONAL AERONAUTICS
AND SPACE ADMINISTRATION
3,535,165
GAS COOLED HIGH TEMPERATURE THERMOCOUPLE
Filed March 6, 1968
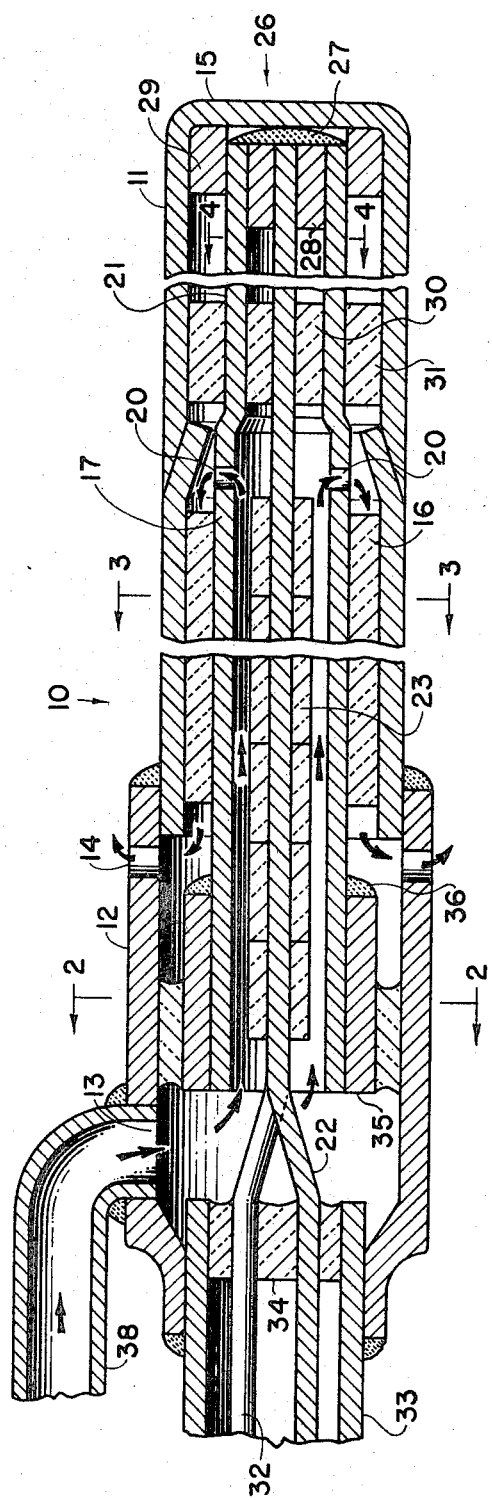
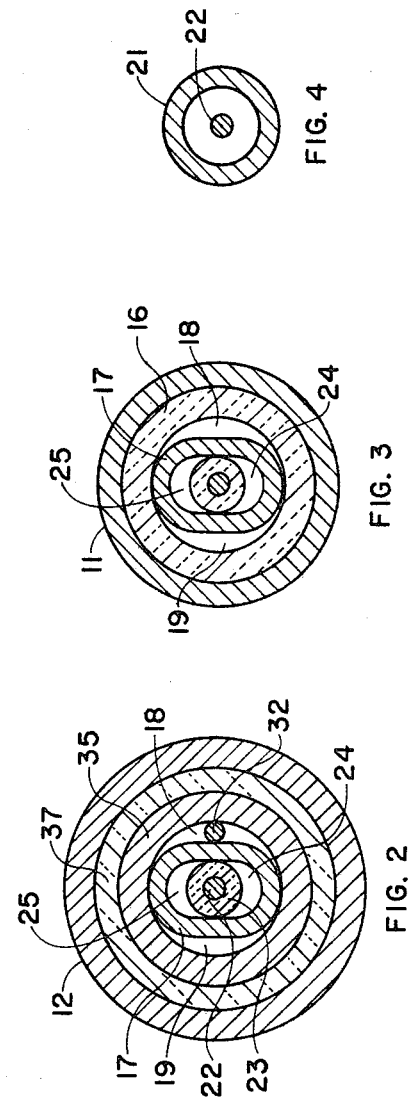
INVENTOR
GEORGE J. ZELLNER
BY
*H. McCoy*
*Norman T. Musial*
ATTORNEYS United States Patent Office 3,535,165
Patented Oct. 20, 1970

3,535,165
GAS COOLED HIGH TEMPERATURE THERMOCOUPLE
James E. Webb, Administrator of the National Aeronautics and Space Administration, with respect to an invention of George J. Zellner, Pittsburgh, Pa.
Filed Mar. 6, 1968, Ser. No. 710,945
Int. Cl. H01v 1/04
U.S. Cl. 136—228                                    10 Claims

ABSTRACT OF THE DISCLOSURE

A fluid cooled thermocouple probe in which a tube of noncircular cross-section is disposed in a closed-end tubular sheath having a layer of insulating material on its inner surface. Apertures are provided in the tube at the end near the sheath closed end. An insulated wire is disposed along the axis of the sheath and joined at the closed end of the sheath to the tube. The sheath is retained in a housing having cooling fluid inlet and outlet means which are in communication with passages formed by the noncircular tube.

---

The invention described herein was made in the performance of work under a NASA contract and is subject to the provision of Section 305 of the National Aeronautics and Space Act of 1958, Public Law 85–568 (72 Stat. 435; 42 U.S.C. 2457).

This invention relates to temperature measuring devices and is directed more particularly to thermocouple probes for use in high temperature environments.

It is often necessary to measure extremely high temperatures, as for example, in nuclear reactors, rocket engines, and jet engines. At temperatures above 4000° R., the sheath of a probe in which a thermocouple element is encased may last only several minutes before the probe is destroyed. The number of materials which are durable enough to last for any reasonable length of time under such high temperature conditions is very limited. Additionally, most of the materials available for use as insulating elements in a thermocouple probe will begin to ionize or will become semiconductors at temperatures above 4000° R. thereby causing errors in the electrical signal being transmitted from the probe to a readout or recording device.

Another problem that arises is that protective sheaths are frequently attacked from within or from the external environment by small amounts of impurities or contaminants which are not a problem at lower temperatures. In order to minimize these effects, various thermocouple probe structures employing cooling have been developed. In some of the prior art structures, tubes have been inserted between the thermocouple elements and the sheath to direct cooling fluids through the probe. With such an arrangement, both the size and complexity of the probe are increased. Additionally, the probe is both difficult to assemble and expensive to manufacture.

Accordingly, it is an object of the invention to provide a new and novel fluid cooled thermocouple probe for use in extremely high temperatures.

It is another object of the invention to provide a fluid cooled thermocouple proble having a small diameter in comparison to prior art designs.

It is a further object of the invention to provide a thermocouple probe which is cooled over substantially its full length but in which a thermocouple junction contained therein is substantially unaffected by the cooling fluid circulated through the probe.

It is yet another object of the invention to provide an improved thermocouple proble which is simple in construction and relatively inexpensive to manufacture.

Other objects and advantages of the invention will become apparent from the following description and drawings in which like numerals are used throughout to identify like parts.

FIG. 1 is a longitudinal cross section of a thermocouple probe embodying the invention;

FIG. 2 is a cross-sectional view taken along the line 2—2 of FIG. 1;

FIG. 3 is a cross-sectional view taken along the line 3—3 of FIG. 1; and

FIG. 4 is a cross-sectional view taken along the line 4—4 of FIG. 1,

Referring now to FIG. 1, there is shown a thermocouple probe 10 including a tubular sheath 11 and a hollow cylindrical housing 12 having a cooling fluid inlet port 13 therein near one end and a plurality of outlet ports 14 equally spaced around the housing near its other end. One end of the tubular sheath 11 which may be made from a material such as tungsten-26% rhenium is telescopingly retained in the hollow cylindrical housing 12 while the other end is formed into a closed end 15. A layer of electrical and thermal insulating material 16 such as magnesium oxide is disposed against the inner surface of the sheath 11 over a lengthwise portion of the sheath 11 adjacent to the housing 12. Other suitable materials such as $ThO_2$, $AlO_3$, $BeO$, $HfO_2$, $ZrO_2$ or $Y_2O_3$ may be substituted for MgO throughout the probe 10.

To the end that cooling fluid passages will be formed in the probe 10, a tube 17 having a noncircular cross section is disposed within the layer of insulating material 16. As shown in FIGS. 2 and 3, the tube 17 is of generally elliptical cross section and forms cooling fluid passages 18 and 19. While the tube 17 is of elliptical cross section in the preferred embodiment of the invention shown, a tube having any suitable noncircular cross section may be utilized. For example, tube 17 could be triangular, rectangular, or any other multi-sided cross-section configuration.

Again referring to FIG. 1, a plurality of apertures 20 lying in a plane perpendicular to the longitudinal axis of the probe and axially located between the end of the insulating layer 16 and the thermocouple end wall 15 are provided in the tube 17.

If desired, a portion 21 of the tube 17 extending between the apertures 20 and the closed end 15 may be of circular cross section. This configuration permits easily fabricated circular plugs and rings to be utilized in the portion 21 as will be described presently.

Advantageously, the tube 17 which forms the cooling fluid passages 18 and 19 serves as one element of the thermocouple. In a preferred embodiment of the invention, the tube 17 is constructed of tungsten-26% rhenium and serves as a negative element of the thermocouple.

To the end that a second pair of cooling fluid passages will be formed in the probe 10, a wire 22 extends through the probe 10 on its longitudinal axis. The wire 22 is encased in an insulator 23 constructed from a material such as magnesium oxide. As shown in FIG. 3, the insulator 23 frictionally engages the interior wall of the tube 17 along the minimum diameter thereof.

In order to minimize the contact area of the insulator 23 and the tube 17, the insulator 23 is of circular cross section. However, as will be obvious to those skilled in the art, other cross-sectional shapes may be employed for the insulator 23 so long as the cooling fluid passages such as 24 and 25 are provided.

A thermocouple junction 26 is formed adjacent to the closed end 15 of the probe 10. To form the junction 26, a weld 27 is deposited over an apertured plug 28 which is inserted into the end of the portion 21 of the tube 17 adjacent to the end 15 of the probe 10. The plug may be constructed of tungsten-26% rhenium, by way of example.

In a preferred embodiment of the invention, the wire 22 is tungsten and serves as the positive element of the thermocouple. An annular ring 29 disposed around the end of the tube 17 comprising the thermocouple junction serves to position and support the tube 17 and the wire 22. The ring 29, by way of example, may be made of tungsten-26% rhenium.

To the end that the thermocouple junction 26 will be substantially unaffected by cooling fluid directed through the probe 10, an apertured plug of insulating material 30 is disposed in the portion 21 of the tube 17 and a ring of insulating material 31 is disposed between the tube 17 and wall of the cylindrical probe 10. The plug 30 and the ring 31 are longitudinally positioned between the end portion 15 of the probe 10 and the apertures 20 thereby forming a chamber around the thermocouple junction 26. Because the plug 30 and the ring 31 prevent cooling fluid from entering the chamber portion of the probe 10 containing the thermocouple junction 26, they may be termed coolant blocking means.

Whatever voltage is produced oat the thermocouple junction 26 is directed out of the probe 10 to suitable amplifying and recording equipment (not shown) by means of a lead 32 connected to the tube 17 and via an extension of the wire 22. Both the lead 32 and the wire 22 extension are enclosed in a suitable conduit 33 and serve as signal carrying leads. A sealing material 34 as for example glass, is disposed in the conduit 33 to prevent cooling fluid from entering the conduit from the housing 12 into which the conduit 33 extends.

The connection of the lead 32 to the tube 17 is accomplished, as shown in FIG. 2, by placing a suitable collar 35 around the tube 17 to hold the lead 32 in contact therewith. The collar 35 may be retained on the tube 17 by a bead of weld 36, as shown in FIG. 1. By way of example, the collar 35 may be fabricated from tungsten-26% rhenium.

The fluid inlet port 13 in the cylindrical housing 12 is isolated from the outlet ports 14 therein by means of a ring of sealing material 37 such as glass or saurersin cement disposed between the collar 35 and the housing 12. The ring of sealing material 37 is axially positioned between the inlet port 31 and the outlet ports 14.

In operation, the sheath portion 11 of the thermocouple probe 10 is inserted into a high temperature environment the temperature of which is to be measured. A cooling fluid, as for example helium, is supplied through a pipe 38 to the inlet port 13 in the housing 12. The cooling fluid flows from the housing 12 toward the end portion 15 of the thermocouple probe 10 through the passages 24 and 25. The cooling fluid then flows radially outwardly through the apertures 20 in the tube 17, toward the housing 12 through the passages 18 and 19 and then exhausts through the ports 14 provided in the housing 12. As will be clear to those skilled in the art, the flow-direction of the cooling fluid may be reversed if desired.

It is understood that changes and modifications may be made to the foregoing thermocouple probe without departing from the spirit and scope of the invention as set forth in the claims appended hereto.

What is claimed is:

1. In a thermocouple probe for use in high temperature environments, the combination of,
    a tubular sheath having an open end and a closed end,
    a tube of noncircular cross section disposed in said sheath and insulated therefrom, said tube having apertures therein adjacent the closed end of the sheath to allow passage of cooling fluid, said tube being formed made from metal, said tube and said sheath forming first passage means therebetween,
    a wire disposed in said tube coaxially with the tubular sheath, said wire being insulated from said tube substantially over the full length of said tube, said wire and said tube forming second passage means therebetween, said wire and said tube being of dissimilar metals, said wire and said tube being joined at the closed end of the sheath whereby a thermocouple junction is formed, and
    means for directing cooling fluid through the first passage means between said tube and said sheath and the second passage means between said wire and said tube whereby the thermocouple probe is cooled sustantially over its full length.

2. The thermocouple probe set forth in claim 1 and including coolant blocking means disposed in the tubular sheath, said coolant blocking means being axially positioned between the apertures in said tube and the thermocouple junction whereby a chamber is formed around the thermocouple junction.

3. The thermocouple probe set forth in claim 2 in which the portion of said tube lying between said coolant blocking means and the closed end of the sheath is of circular cross section.

4. The thermocouple probe set forth in claim 2 and including a hollow housing having inlet and outlet means for cooling fluid, the open end of said sheath being retained in said housing, and means for establishing communication between said inlet and outlet means and said first and second passage means whereby cooling fluid is directed through the probe.

5. The thermocouple probe as set forth in claim 4 in which said tube is of generally elliptical cross section and in which an insulator of circular cross section is disposed on said wire.

6. The thermocouple probe as set forth in claim 5 and including a pair of signal carrying leads extending out of the probe, one of said leads being an extension of said wire and the other being held in contact wtih said tube by a collar disposed around said tube.

7. The thermocouple probe set forth in claim 1 and including a pair of signal carrying leads extending out of the probe, one of said leads being an extension of said wire and the other being held in contact with said tube by a collar disposed around said tube.

8. The thermocouple probe as set forth in claim 1 in which a layer of magnesium oxide is disposed against the inner surface of the tubular sheath to insulate said tube therefrom, and a magnesium oxide insulator is disposed on said wire to insulate said tube therefrom.

9. The thermocouple probe s set forth in claim 8 in which said sheath and said tube are tungsten-26% rhenium, said tube being of generally elliptical cross section, said wire being tungsten, and said insulator on said wire having a generally circular cross section.

10. The thermocouple probe s set forth in claim 1 in which said sheath and said tube are tungsten-26% rhenium, said wire being tungsten.

References Cited

UNITED STATES PATENTS

| | | | |
|---|---|---|---|
| 2,943,132 | 6/1960 | Jackson | 136—219 |
| 3,301,715 | 1/1967 | Gerrard et al. | 136—233 X |
| 3,466,200 | 9/1969 | Mellor et al. | 136—228 |

CARL D. QUARFORTH, Primary Examiner

H. E. BEHREND, Assistant Examiner

U.S. Cl. X.R.

136—233